United States Patent [19]

House

[11] 4,322,310

[45] Mar. 30, 1982

[54] CHIRAL SUPPORTS FOR RESOLUTION OF RACEMATES

[75] Inventor: David W. House, Arlington Heights, Ill.

[73] Assignee: UOP Inc., Des Plaines, Ill.

[21] Appl. No.: 158,751

[22] Filed: Jun. 12, 1980

[51] Int. Cl.³ .............................................. B01D 15/08
[52] U.S. Cl. ..................................... 252/184; 210/635; 210/656; 210/659; 252/430; 252/455 R; 252/463; 428/407; 428/702
[58] Field of Search ................... 252/184, 430, 455 R, 252/463; 210/635, 656, 659; 428/404, 407, 451, 702

[56] References Cited

U.S. PATENT DOCUMENTS 4,111,838  9/1978  Schaeffer ........................... 210/656
4,159,966  7/1979  Roberts ............................. 252/430

OTHER PUBLICATIONS

Henderson et al., Nature, vol. 141, (May 21, 1938), pp. 917-918.
Henderson et al., Nature, vol. 142, (Jul. 23, 1938), pp. 162-163.
Blaschke et al., Chemische Berichto, vol. 109, (1976), pp. 1967-1975.
Baczue et al., J. of Chromatography, vol. 60, (1971), pp. 351-361.

*Primary Examiner*—Benjamin R. Padgett
*Assistant Examiner*—Irwin Gluck
*Attorney, Agent, or Firm*—James R. Hoatson, Jr.; Eugene I. Snyder; William H. Page, II

[57] ABSTRACT

A composition comprising a chiral organic amine covalently linked via a carbamate, mercaptocarbamate, or urea linkage to a chain of atoms whose other terminus is covalently bound to a core support may be used as a solid phase chromatographic medium in the separation of racemic mixtures. An example is alpha-methylbenzyl amine bound through a carbamate linkage to a 3-propylsilyl group covalently bonded to an alumina support.

9 Claims, No Drawings

CHIRAL SUPPORTS FOR RESOLUTION OF RACEMATES

BACKGROUND OF THE INVENTION

Ever since Pasteur discovered the property of optical activity displayed by chiral compounds, the resolution of racemic mixtures into their enantiomeric components has posed a challenge. Substantial progress in separating enantiomeric pairs has been achieved since Pasteur's laborious hand separation of the enantiomeric crystals of racemic sodium ammonium tartrate, yet methods of resolution, and the materials used therefor, remain a formidable obstacle to commercial production of optically active organic substances.

A traditional method of resolution comprises reacting a racemic mixture with a second optically active substance to form a pair of diastereomeric derivatives. Such derivatives generally have different physical properties which permit their separation by conventional means. For example, fractional crystallization often permits substantial separation to afford at least one of the diastereomers in a pure state, or largely so. An appropriate chemical transformation then converts the purified derivative, which was formed initially solely to prepare a diastereomeric pair, into one enantiomer of the originally racemic compound. This traditional method is exemplified by the reaction of naturally occurring optically active alkaloids, for example, brucine, with racemic acids to form diastereomeric salts, with release of an optically active organic acid from a purified diastereomer upon acidification of the latter.

Such traditional methods suffer from many limitations. Generally, only one of the enantiomeric pairs can be obtained, so yields are necessarily less than 50%. The separation of the material so obtained usually is incomplete, leading to materials with enhanced rather than complete optical purity. The optically active materials used to form the diastereomers frequently are expensive and quite toxic—the alkaloids as a class are good examples—and are only partially recoverable. Regeneration of optically active material from its derivative may itself cause racemization of the desired compound, leading to diminution of optical purity. For example, if optically active benzyl alcohols are prepared through their diastereomeric ester derivatives, subsequent acid hydrolysis of the latter to regenerate the alcohol may be accompanied by appreciable racemization.

With the advent of chromatography diverse variations on the basic method of separating diastereomers became possible. These approaches undeniably represent substantial advances in the art, yet fail to surmount the basic need, and associated problems, to prepare diastereomeric derivatives of the desired compound and to transform such derivatives after separation to the optically active compounds of interest.

Chromatographic methods of separation offer the advantages of general application, mild conditions which generally preclude chemical or physical transformation, efficiency of recovery and separation which are limited only by the number of theoretical plates employed, and the capability of utilization from a milligram to kilogram scale. Translation from a laboratory to industrial scale has proved feasible, and commercial processes employing chromatographic separation occupy an important position in the arsenal of available industrial methods. For such reasons, methods based on chromatographic separation remain under intensive exploration.

To circumvent the disadvantage of separating diastereomeric derivatives of a compound while retaining the advantages of chromatographic separation, recent advances in the art have employed chiral, optically active compounds in association with the chromatographic support. The theory underlying this approach is that chiral material will have differential weak interactions with enantiomers, for example, hydrogen bonding, or acid-base interactions generally. Such weak interactions lead to reversible formation of entities which we refer to as complexes, and the equilibrium constant characterizing complex formation will differ for each member of the enantiomeric pair. The different equilibrium constants manifest themselves as a differing partition coefficient among the phases in a chromatographic process, leading ultimately to separation of enantiomers.

Thus, enantiomers of some chromium complexes were resolved by chromatography on powdered quartz, a naturally occurring chiral material. Karagounis and Coumolos, *Nature*, 142, 162(1938). Lactose, another naturally occurring chiral material, was used to separate p-phenylene-bis-iminocamphor. Henderson and Rule, *Nature*, 141, 917(1938). However, despite this knowledge substantiating theoretical considerations, advances in the art have been tortuous at best.

A major obstacle has been development of a chiral solid phase capable of resolving, at least in principle, a broad class of racemic organic compounds, with a stability which permits repeated usage, and with adequate capacity to make separation feasible on a preparative scale. Gil-Av has made a major contribution toward one kind of solution by gas-liquid phase chromatographic resolution of enantiomers using columns coated with N-trifluoroacetyl derivatives of amino acids, di- and tri-peptides. Gil-Av and Nurok, "Advances in Chromatography", Volume 10, Marcel Dekker (New York), 1974. However, the advances suffer practical limitations originating from the need to have volatile substrates and the inability to scale up methods employed.

Another advance is represented by the work of Baczuk and coworkers, *J. Chromatogr.*, 60, 351(1971), who covalently bonded an optically active amino acid through a cyanuric acid linkage to a modified dextran support and utilized the resulting material in column chromatography to resolve 3,4-dihydroxyphenylalanine. A different approach is exemplified by polymerization of optically active amides with the resulting polymer used as a solid phase in liquid-solid chromatography. Blaschke and Schwanghart, *Chemische Berichte*, 109, 1967(1976).

General considerations of the characteristics of a solid phase chiral chromatographic medium, including such factors as structural integrity, flow characteristics, chemical inertness, reusability, capacity, and incorporation into well developed commercial processes, suggest that a desirable material will be comprised of (1) a solid, largely inorganic support, bearing a (2) pendant functional group sufficiently removed from the surface of the support so that it may (3) covalently bond with a suitable site of a chiral molecule while enabling the latter to at least simulate its homogeneous interactions with racemic compounds it encounters.

SUMMARY OF THE INVENTION

An object of this invention is to provide chiral material which can be used as a solid stationary phase in the chromatographic separation of racemic mixtures. An embodiment of this invention comprises a chiral benzyl amine covalently bonded via a formed carbamate, mercaptocarbamate, or urea linkage to a chain of atoms whose terminus is covalently bonded to an inorganic support. In a specific embodiment the support is silica or alumina. In another specific embodiment the amine is 1-phenylethyl amine or nuclear substituted derivatives thereof.

DESCRIPTION OF THE INVENTION

A consideration of the theoretical mode of separation of racemates by chiral solid phase chromatographic media and desirable functional attributes of such media has led to compositions described herein. Said compositions of this invention are comprised of three parts: 1. an inert core support, providing mechanical strength, good flow properties, and being capable of chemically binding with a spacer molecule, with or without prior modification of the surface of the core support; 2. a spacer molecule, which is a chemical grouping one end of which is chemically bonded to the core support, the other end of which initially bears a functional group maintained at some distance from the surface of the core support by mediating atoms or groups of atoms; and 3. a chiral amine, whose chiral center is adjacent to the nitrogen atom, covalently bonded to the remaining terminus of the spacer molecule via the aforementioned functional group so as to retain its chirality and to preseve substantially the physical and chemical properties exhibited in homogeneous media.

More specifically, the material of this invention comprises a chiral amine covalently bonded by a formed carbamate, mercaptocarbamate, or urea linkage to an intervening chain of atoms acting as a spacer molecule, and whose remaining terminus is covalently bonded to the core support. The materials of this invention may be represented by the structure,

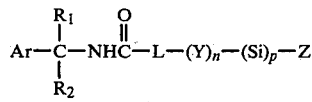

The core supports, Z, of this invention include metal oxides, glass, and ceramic materials. Among the metal oxides are included such materials as silica, alumina, zirconia, thoria, and combinations thereof. Silica and alumina are preferred materials of this invention, and among the aluminas gamma-alumina is especially preferred. In some applications glass or ceramic materials may be desirable. Another class of suitable core supports which may be used in this invention is organic polymers, as represented, for example, by polystyrene cross-linked with divinylbenzene.

The term "spacer molecule" as used in the present specification of this invention is a chain of atoms which performs the function of maintaining the chiral organic material at a sufficient distance from the surface of the core support so that the chiral material has, at least approximately, the characteristics and attributes it displays under homogeneous conditions. In this invention that part of the composition which can be termed the spacer molecule is designated in the formula as $(Y)_n$.

One of its essential attributes is that one terminus of this spacer molecule is covalently bonded to a chiral organic amine via a formed carbamate, mercaptocarbamate, or urea linkage. Another essential attribute is that the remaining terminus is covalently bonded to the core support, Z, either directly or indirectly via a silicon atom. In one aspect of this invention, Y is a chain of methylene groups, $CH_2$, where n is an integer from 1 to about 10, terminating in a silicon atom, i.e., p equals 1. This spacer molecule is then a polyalkylenesilyl group. In another aspect, Y is a chain of oxyethylene, $CH_2CH_2O$, or oxypropylene, $CH_2CHCH_3O$, groups where n has a value from 1 to about 10, either bound directly to the core support, i.e., p equals 0, or bound to the core support via a silicon atom, i.e., p equals 1. The value of n determines how far the chiral portion is held from the surface of the core support. It may be varied to achieve optimum efficiency of resolution depending, for example, on the nature of the chiral material, the nature of the racemate, the solvent system used, etc.

The atom, L, in the material of this invention is selected from the group consisting of oxygen, sulfur, and nitrogen. Where L is an oxygen atom, a carbamate linkage is present; where L is sulfur, a mercaptocarbamate linkage is present; and where L is nitrogen, a urea linkage is present.

That portion of the composition of this invention which is represented by the structure $ArCR_1R_2NH$ represents a chiral organic amine, where the chirality is identified with the carbon atom adjacent to the amino group, i.e., the carbon atom interposed between Ar and NH in the structure above is a chiral center. Ar represents an aryl group, where the preferred aryl group of this invention is a phenyl group and nuclear substituted derivatives thereof. However, it is contemplated that other aryl groups are within the scope of this invention, such as naphthyl, anthryl, phenanthryl, and so on. Where the aryl group is a phenyl group, the amines of this invention are alpha-substituted and alpha, alpha-disubstituted benzyl amines.

The aryl group may bear a wide variety of substituents on its ring. Thus, the aromatic ring may bear such groups as halogen, alkyl, hydroxy, alkoxy, alkylamino, dialkylamino, trialkylammonium, acylamino, nitro, trifluoromethyl, cyano, carboxyl, carboalkoxy, and sulfonyl moieties. It has been found that strongly electronegative or electropositive groups may be especially advantageous. Among such groups are fluoro, hydroxy, alkoxy, dialkylamino, trialkylammonium, nitro, trifluoromethyl, cyano, and sulfonyl. Such nuclear substituted aromatic rings may contain up to 3 such substituents in any combination, and the presence of at least two substituents often is highly desirable.

The groups $R_1$ and $R_2$ of the materials of this invention are alkyl groups containing from 1 to about 10 carbon atoms, and may be branched or unbranched, saturated or unsaturated. Additionally, $R_2$ may be a hydrogen atom. To preserve the chirality of the carbon atom to which $R_1$ and $R_2$ are bonded, it is essential that $R_2$ be different from $R_1$.

The preparation of the materials of this invention may be performed by any suitable means. For example, a suitable method commonly employed utilizes a preliminary drying of the inorganic oxide, such as silica or alumina, generally under vacuum and at temperatures up to about 200° C., for times up to about 24 hours, the particular time and temperature depending upon the nature of the oxide. The dried inorganic oxide is then treated with a silylating agent in a solvent under an inert atmosphere. Silylation is conducted using an omega-substituted alkylsilane derivative bearing from 1 to 3 alkoxy groups. Examples of suitable silylating agents are 3-hydroxypropyl-triethoxysilane, 4-aminobutyl-trimethoxysilane, and 10-mercaptodecyl-methoxyethoxypropoxysilane. Use of a solvent system comprised of an aromatic solvent, such as toluene, and an organic base, such as pyridine, frequently is advantageous. The mixture may be stirred at temperatures from about 50° to about 100° C. for a time sufficient for silylation, generally from 5 to 50 hours. The resulting silylated inorganic support is then separated, as by filtration, and washed successively with organic solvents, such as alcohols, ketones, and hydrocarbons, to remove residual solvents while maintaining the silylated material in a more or less anhydrous condition. Silane loadings of from about 0.1 to about 10 millimoles per gram of inorganic oxide may be obtained, although typically loadings of about 1 millimole per gram may be observed.

The silylated support may then be contacted with an isocyanate derived from the amines of this invention. Such isocyanates may be prepared by any means suitable in the art, and need not originate from the amine itself. One common method of preparing such isocyanates is treatment of the chiral amine with phosgene in an inert solvent and in the presence of an organic base such as pyridine. A solution of the isocyanate in a suitable solvent, such as an inert aromatic compound, is contacted with the silylated support for a time and at a temperature suitable to ensure reaction of the isocyanate group with the functional group present on the silyl portion. Reaction temperatures from ambient to about 100° C. for times from about 0.5 to about 60 hours frequently are employed depending on the nature of the isocyanate and the nature of the functional group on the silylated support. Use of a catalyst, such as dimethylaminoethanol in amounts up to about 5 mole percent, often may be employed advantageously to reduce the reaction time. Solid may then be separated, as by filtration, and washed with organic solvents to remove adhering but unbound organic material. The resulting composition may then be packed into columns for use as a chromatographic medium in the resolution of racemic mixtures.

The examples cited below serve only to illustrate this invention. They are not to be construed in any way as a limitation thereof.

EXAMPLE 1

Silica gel (4.0 g of 10 micron Partisil from Whatman, Inc.) was dried at 1 mm. Hg. at 150° C. for six hours. Dry nitrogen was admitted to the cooled silica gel, and about 7 ml. of 3-aminopropyl-triethoxysilane dissolved in 20 ml. of a 1:1 solution of dried pyridine and toluene were quickly added. The mixture was maintained at 80° C. for 48 hours with occasional stirring. The solid was removed by filtration and washed successively with methanol, acetone, diethyl ether, and pentane, following which, the silylated silica gel then was air dried, and finally vacuum dried to remove residual solvents.

A solution of the isocyanate derived from d-(+)-1-phenylethylamine in dry tetrahydrofuran may be added to a slurry of 3-aminopropyl silylated silica gel prepared as above. Generally it is advantageous to add an excess, from about 5 to about 25 percent, of the isocyanate based on the prior analyzed silane loading. The mixture may be stirred at room temperature under a nitrogen blanket for about 40 hours, after which solid may be removed by filtration and washed with acetone and diethyl ether.

EXAMPLE 2

In this example the silylating agent is 6-hydroxyhexyltrimethoxysilane and the core support is alumina. Otherwise, the preparation of the silylated support may be performed in a manner analogous to that described in Example 1.

A solution of the isocyanate derived from 1-(−)-1-(3,5-dinitrophenyl)ethylamine in toluene may be stirred with the silylated support at 70° C. for about 45 hours. The cooled mixture may be filtered to obtain solid, which may then be washed with appropriate solvents to remove adhering but unbound material. For example, the solid may be washed first with toluene, then acetone, and finally diethyl ether to afford desired material which is free from adhering but unbound organic substances.

EXAMPLE 3

In this example the silylating agent may be 10-mercaptodecyl-triethoxysilane and the core support may be silica. The procedure for silylating the silica is analogous to that described in example 1.

A solution of isocyanate derived from d-(+)-1-(2,4,6-trifluromethylphenyl) ethyl amine in dry tetrahydrofuran, containing 10% excess isocyanate based on the silane loading and 3 mole percent dimethylamino may be stirred with a silylated support at reflux for about 18 hours. Solid may be separated from the cooled mixture by filtration, and the solid material may be washed thoroughly with tetrahydrofuran, benzene, and diethyl ether to afford the final product.

What is claimed is:

1. A chiral composition of the structure

where Ar is an aryl group; $R_1$ is an alkyl group containing from 1 to about 10 carbon atoms; $R_2$ is selected from the group consisting of hydrogen and an alkyl group containing from 1 to about 10 carbon atoms, with $R_2$ being different from $R_1$; L is selected from the group consisting of oxygen, sulfur, and nitrogen; Y is selected from the group consisting of $CH_2$, $CH_2CH_2O$, and $CH_2CHCH_3O$; n is an integer from 1 to about 10; p is 0 or 1; Z is a solid support selected from the group consisting of silica, alumina, glass, and ceramic materials; and where the carbon atom interposed between the aryl group and nitrogen atom of said structure is a chiral center.

2. The composition of claim 1 where the aryl group is selected from the group consisting of phenyl, naphthyl, anthryl, and phenanthryl moieties.

3. The composition of claim 2 where the aryl group bears at least one substituent selected from the group consisting of halogen, alkyl, hydroxy, alkoxy, alkylamino, dialkylamino, acylamino, trialkylammonium, nitro, trifluoromethyl, cyano, carboxyl, carboalkoxy, and sulfonyl moieties.

4. The composition of claim 3 where the aryl group bears at least two substituents selected from the group consisting of fluorine, nitro, trifluoromethyl, dialkylamino, trialkylammonium, cyano, and sulfonyl moieties.

5. The composition of claim 1 where $R_2$ is hydrogen.

6. The composition of claim 1 where p is 1, Y is $CH_2$, and n is an integer from 1 to about 10.

7. The composition of claim 6 where n is 3.

8. The composition of claim 6 where said aryl group is a phenyl group and $R_2$ is hydrogen.

9. The composition of claim 8 where the phenyl group bears at least one substituent from the group consisting of nitro, fluoro, trifluoromethyl, dialkylamino, trialkylammonium, cyano, and sulfonyl groups.

* * * * *